United States Patent
Wick

(10) Patent No.: US 6,740,710 B1
(45) Date of Patent: May 25, 2004

(54) COMPOSITION AND METHOD FOR WATERPROOFING EXPLOSIVE MATERIALS

(76) Inventor: Jack J. Wick, 120 Liberty Rd., Harmony, PA (US) 16037

( * ) Notice: Subject to any disclaimer, the term of this patent is extended or adjusted under 35 U.S.C. 154(b) by 0 days.

(21) Appl. No.: 10/224,544

(22) Filed: Aug. 20, 2002

Related U.S. Application Data

(60) Provisional application No. 60/313,539, filed on Aug. 20, 2001.

(51) Int. Cl.$^7$ .................. C09D 175/14; C08G 18/69; C08G 18/71
(52) U.S. Cl. ................... 525/123; 528/53; 528/54; 528/67; 528/69; 528/75
(58) Field of Search ................ 525/123; 528/53, 528/59, 67, 69, 75

(56) References Cited

U.S. PATENT DOCUMENTS

| | | | | |
|---|---|---|---|---|
| 2,155,499 A | | 4/1939 | Lawson | |
| 3,479,325 A | * | 11/1969 | Blomeyer | 528/69 |
| 4,360,571 A | | 11/1982 | Rabatin | |
| 4,721,754 A | * | 1/1988 | Baghdadchi | 525/194 |
| 5,516,378 A | | 5/1996 | Henry, III et al. | |
| 6,060,560 A | * | 5/2000 | St. Clair | 525/124 |

* cited by examiner

*Primary Examiner*—Patricia A. Short
(74) *Attorney, Agent, or Firm*—Webb Ziesenheim Logsdon Orkin & Hanson, P.C.

(57) ABSTRACT

The present invention provides a method and composition for waterproofing explosive materials. The method includes providing a waterproofing composition and subsequently coating an explosive material with the composition to produce a moisture barrier. In one embodiment, the composition comprises a reaction product of from 25 to 40 percent by weight of mixed isomers of diphenylmethane diisocyanate; from 45 to 85 percent by weight of a polymer derived from 1,3-butadiene and containing functional groups that are reactive with an isocyanate group; from 0.005 to 0.05 percent by weight of an aromatic isocyanate; and from 0.005 to 0.05 percent by weight of a catalyst.

9 Claims, 2 Drawing Sheets

COMPOSITION AND METHOD FOR WATERPROOFING EXPLOSIVE MATERIALS

CROSS REFERENCE TO RELATED APPLICATION

This application claims the benefit of U.S. Provisional Application bearing Ser. No. 60/313,539, filed Aug. 20, 2001, which is herein incorporated by reference in its entirety.

BACKGROUND OF THE INVENTION

1. Field of the Invention

The present invention relates generally to explosive materials and, more particularly, to a composition and method for applying a moisture barrier coating to an explosive material.

2. Technical Considerations

Explosive compositions generally consist of a fuel component and an oxidizer component. Many known compositions utilize organic or inorganic nitrates as the oxidizer component in combination with an organic acid as the fuel component. These combustible compositions have utility as gunpowder, explosives, propellants, and pyrotechnic applications. Depending on the characteristics of the fuel component, the oxidizer component, and/or the explosive composition as a whole, differing explosive compositions will perform differently. Some explosive compositions perform best as deflagrating agents or propellants. Other explosive compositions are utilized as detonating compounds. Still other explosive compositions are utilized in pyrotechnic applications.

Typically, gunpowder, propellants, and other particulate explosive materials are manufactured by methods which yield a product having a moisture content substantially higher than that ultimately desired. By way of example, gunpowder of the type generally known as "black powder" is one explosive composition which has been used for centuries as a propellant, deflagrating agent, explosive, and pyrotechnic compound. Conventional black powder is commonly composed of an intimate mixture of potassium nitrate, sulfur, and charcoal, wherein the potassium nitrate is the oxidizing agent while the sulfur and charcoal constitute the fuel component. Black powder, as with most gunpowders, also exhibits some degree of hydroscopicity, which can limit product life and create unpredictability in performance. By "hydroscopicity" is meant the absorption of water, such as from the atmosphere. Excessive moisture in any explosive material can create a dangerous condition for the user. It is desirable to have predictable performance of an explosive composition when it comes to safe handling, burning, and detonation of an explosive material.

By way of example, explosive material, such as certain rocket propellants, can typically have moisture contents as high as 70% or more by weight, which is substantially higher than that which is ultimately desired. Also, due to the hydroscopicity of the explosive material, the product life or shelf life of the explosive material can be limited by accumulating or attracting moisture, thereby creating unpredictability in performance.

Another way an explosive material can accumulate moisture is by exposure to outdoor environments, such as rain or high humidity. For example, black powder is used by many hunters who use muzzleloader rifles during hunting season. Some states even have a special black powder season for hunters who hunt with muzzleloader rifles. In this outdoor environment, the black powder may become damp when loading it into the muzzleloader rifle. Excessive moisture in the black powder can cause the muzzleloader to misfire, thus either creating a potentially dangerous condition or simply inconveniencing the hunter.

It is, therefore, an object of the present invention to overcome at least some of the above deficiencies by providing a coating composition and coating method that provide a moisture barrier for explosive materials. It is also an object of the invention to provide a moisture barrier coating and/or coating method which will not substantially adversely affect the properties or characteristics of the explosive material. Another object of the present invention is to reduce the moisture content of the explosive material by removing residual moisture as a coating composition of the invention is applied to the explosive material.

SUMMARY OF THE INVENTION

The present invention provides a composition and a method for treating an explosive material by coating the explosive material with a composition of the invention, thereby providing a moisture barrier to the explosive material. The method includes providing a waterproofing composition and subsequently coating an explosive material with the composition to produce a moisture barrier. In one embodiment, the composition can comprise a reaction product of from 25 to 40 percent by weight of at least one polyisocyanate, such as 33.1 percent by weight; from 45 to 85 percent by weight of a polymer derived from 1,3-butadiene and containing functional groups that are reactive with an isocyanate group, such as 66.2 percent by weight; from 0.005 to 0.05 percent by weight of an aromatic isocyanate, such as 0.02 percent by weight; from 0.005 to 0.05 percent by weight of a catalyst, such as 0.02 percent by weight; optionally from 0.05 to 1.5 percent by weight of a drying agent, such as 0.66 percent by weight; and optionally from 1 to 25 percent by weight of a solvent, all percentages by weight being based on the total weight of the composition.

A method for preparing a composition for waterproofing explosive materials is also provided and comprises:

a. mixing a plurality of chemical components comprising:
   i) 25 to 40 percent by weight, based on the total weight of the composition, of at least one polyisocyanate;
   ii) 45 to 85 percent by weight, based on the total weight of the composition, of a polymer derived from 1,3-butadiene and containing functional groups that are reactive with an isocyanate group; and
   iii) 0.005 to 0.05 percent by weight, based on the total weight of the composition, of an aromatic isocyanate;
b. adding a catalyst in a range of from 0.005 to 0.05 percent by weight, based on the total weight of the composition, to the components in step a; and
c. allowing the components to react.

DETAILED DESCRIPTION OF THE PREFERRED EMBODIMENTS

Figure 1:
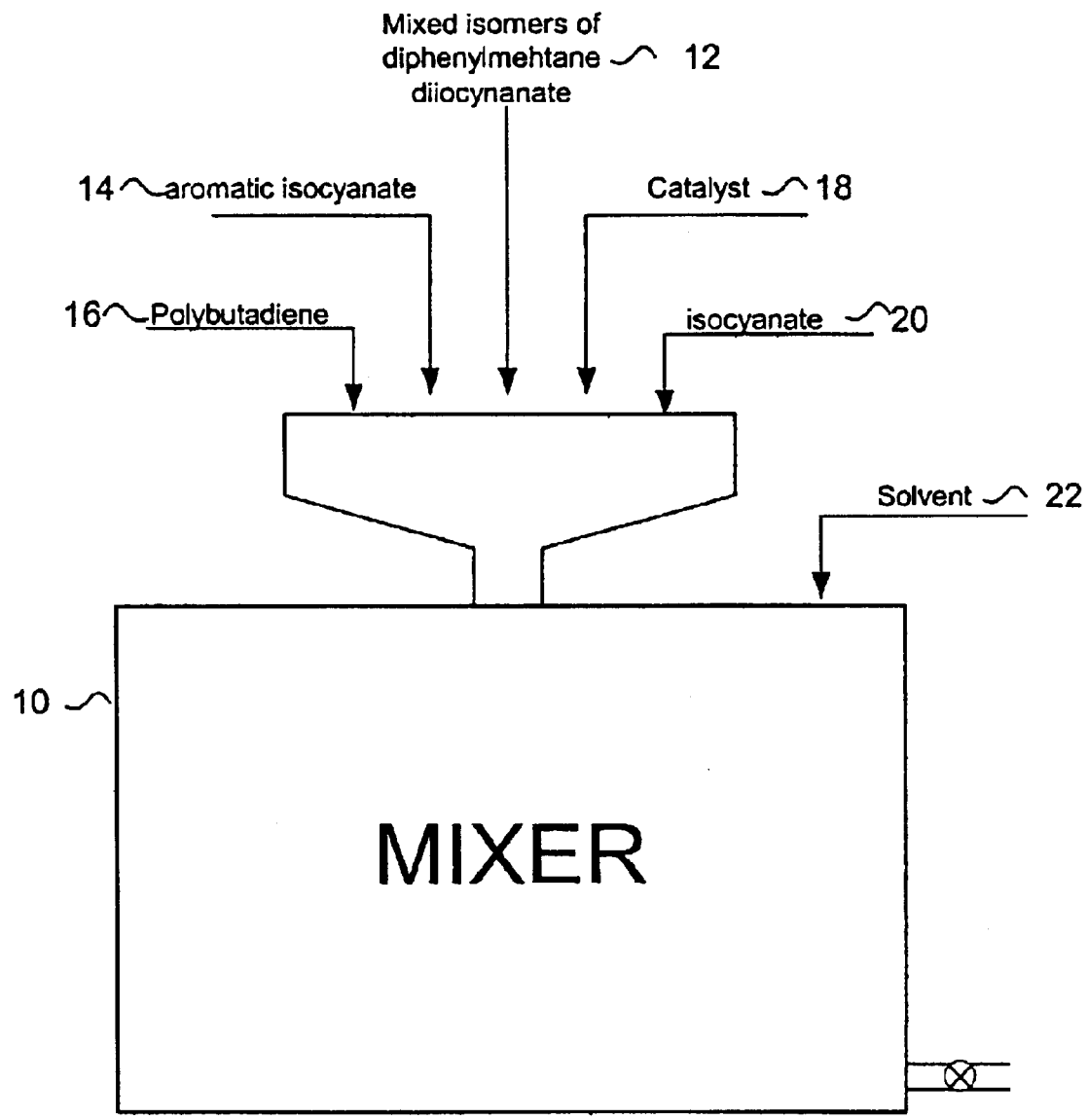
FIG. 1 shows an exemplary method of producing a composition for waterproofing explosive materials made in accordance with the present invention.

In the following discussion, all numbers expressing dimensions, physical characteristics, processing parameters, quantities of ingredients, reaction conditions, and the like used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Additionally, all percentages disclosed herein are "by weight" based on a total weight of the composition unless indicated to the contrary. As used herein, the term "polymer" refers to both homopolymers and copolymers.

The present invention provides a composition and a method for waterproofing explosive and/or reactive materials. By "waterproof" or "waterproofing" is meant applying a moisture barrier over an explosive material. By "moisture barrier" is meant a coating or layer that prevents or at least inhibits the passage of moisture through the barrier. The explosive materials utilized can be any conventional explosive materials. For example, the explosive materials can be, but are not limited to, gunpowder, powders for blasting, high explosive blasting materials, detonators, and other detonating agents, smokeless powder, and any chemical compound or any mechanical mixture containing any oxidizing and combustible units, or other ingredients in such proportions, quantities, or packing that ignition by fire, friction, concussion, percussion, or detonation of any part thereof can and is intended to cause an explosion, such as ammonium nitrate. The explosive material can also be in the form of a granulated powder or a pelletized powder. Additionally, the explosive material can be a welding rod.

Exemplary explosives for use in firearms can include ammunition powder, such as smokeless powder for loading or reloading small arms ammunition or black powder for loading or reloading small arms ammunition, antique arms, or replicas of antique arms. Whenever these explosive materials have a substantially high moisture content, the performance of the explosive can become unpredictable. By "substantially high moisture content" is meant a moisture content that adversely affects the performance of the explosive material for an intended use. Exemplary performance indicators of the explosive material that can be adversely affected by moisture include burning rate, detonation, or explosive power. For hunters that use black powder or smokeless powder in muzzleloaders, a high moisture content of the powder can cause misfires in the firearm. An explosive material that is coated with a coating composition that provides a moisture barrier without affecting the properties of the explosive material would increase the storage life and maintain the predictability of the explosive material's performance. For hunters, black powder that is coated with the composition could help prevent the firearm from misfiring.

The polyisocyanate used to prepare the waterproofing composition of the present invention may be an aliphatic or an aromatic polyisocyanate or a mixture of the two. Diisocyanates are usually used, although higher polyisocyanates can be used in place of or in combination with diisocyanates. Examples of suitable aromatic diisocyanates include 4,4'- diphenylmethane diisocyanate and isomers thereof, and toluene diisocyanate. Examples, of suitable aliphatic diisocyanates include straight chain aliphatic diisocyanates, such as 1,6-hexamethylene diisocyanate. Also, cycloaliphatic diisocyanates can be used. Examples include isophorone diisocyanate and 4,4'-methylene-bis-(cyclohexyl isocyanate). Aralkyl diisocyanates that may be used include meta-xylylene diisocyanate and $\alpha,\alpha,\alpha',\alpha'$-tetra methylmetazylylene diisocyanate. Examples of suitable higher polyisocyanates include 1,2,4-benzene triisocyanate and 4,4'-meihylene-bis-(cyclohexyl isocyanate). Biurets and isocyanurates of any suitable diisocyanate may also be used in the preparation of the composition of the present invention. Mixed isomers of diisocyanates can be used, in particular, a mixture of 2,4'/4,4' diphenylmethane diisocyanate, commercially available from BASF Corporation under the product name LUPRANATE® MI. In one non-limiting embodiment, the polyisocyanate may be present in an amount of 25 to 40 percent by weight, such as 30 to 35 percent by weight, such as 33.1 percent by weight, based on the total weight of the composition.

The polymer used to prepare the composition of the present invention can be derived from 1,3-butadiene and can contain functional groups that are reactive with an isocyanate group. Such functional groups can include hydroxyl and amino groups. The polymer can be prepared via additional polymerization techniques using ethylenically unsaturated monomers, such as vinyl monomers as known to those skilled in the art. In a particular embodiment, the polymer contains terminal hydroxyl groups. One example of a suitable polymer is a hydroxyl-terminated polymer derived from 1,3-butadiene commercially available from Elf Atochem North America Inc. under the product name POLY BD® R-45 HTLY Resin. In one non-limiting embodiment, the polymer can be present in an amount of 45 to 85 percent by weight, usually 50 to 75 percent by weight, often 60 to 65 percent by weight, most often 66.2 percent by weight, based on the total weight of the composition.

The aromatic isocyanate used to prepare the waterproofing composition of the present invention may be a single isocyanate or a mixture of two or more different species. It may be the same as or different than the polyisocyanate described above. Most often, the aromatic isocyanate is a monofunctional isocyanate. Examples of suitable aromatic isocyanates include dimethyl-m-isopropenyl benzyl isocyanate and isocyanatobenzene, commercially available from Bayer Corporation under the name MONDUR ML. In one non-limiting embodiment, the aromatic isocyanate may be present in the waterproofing composition of the present invention in an amount of 0.005 to 0.05 percent by weight, usually 0.01 to 0.05 percent by weight, often 0.01 to 0.03 percent by weight, most often 0.02 percent by weight, based on the total weight of the composition.

A fourth component used in the preparation of the composition can be a catalyst. One exemplary catalyst suitable for the invention is an amine material, such as a mixture of one or more amines, e.g., tertiary amines, in a solvent. Tertiary amines are most often used because they do not interfere with the reaction. Suitable tertiary amines include, for example, N,N-dimethyl dodecylamine, triethylamine, and the like. One exemplary solvent includes dipropylene glycol. A particularly suitable catalyst is commercially available from Air Products and Chemicals Inc. under the product name DABCO® 33 LV Catalyst. In one non-limiting embodiment, the fourth component may be present in the composition in the range of 0.005 to 0.05 percent by weight, typically 0.01 to 0.03 percent by weight, often 0.02 percent by weight, based on the total weight of the composition.

In one particular embodiment, the polyisocyanate comprises mixed isomers of diphenylmethane diisocyanate and contains 4,4'-diphenylmethane diisocyanate. The polybutadiene can include a hydroxy-terminated polymer derived from 1,3-butadiene. The aromatic isocyanate used to prepare the composition can be isocyanatobenzene. The catalyst in the composition can include a mixture of tertiary amines in a solvent, such as dipropylene glycol. The drying agent in the composition can be p-toluenesulfonyl isocyanate. The solvent in the composition can be any inert solvent known in the art, such as but not limited to acetone, xylene, methylethylketone, methylisobutylketone, or toluene.

FIG. 1 shows an exemplary method of making a waterproofing composition of the invention. The composition can be made in batches or can also be made on a continuous system. Batch sizes can be of any desired size, such as but not limited to from 5 grams to 10,000 pounds, depending on the size of the mixing chamber. In the following discussion, the weight percent values are based on the final weight of the composition. In the non-limiting exemplary method, mixed isomers of diphenylmethane diisocyanate 12 (e.g., in a range from 25 to 40 percent by weight, such as 33.1 percent by weight), an aromatic isocyanate 14 (e.g., in a range from 0.005 to 0.05 percent by weight, such as 0.02 percent by weight), and polybutadiene 16, e.g., a polybutadiene diol, (e.g., in a range from 45 to 85 percent by weight, such as 66.2 percent by weight) are added to a mixer 10. The components in the mixer 10 can be mixed for a sufficient time to provide a substantially uniform mixture, such as in the range of 1 minute to 3 hours, typically 10 minutes to 2 hours, e.g., 1 hour. During mixing, the temperature of the components can be controlled in any conventional manner. For example, the temperature can be controlled to be less than 100° C., such as less than 90° C., typically less than 80° C., often less than 70° C., more often less than or equal to 65° C. Once mixing has occurred, a catalyst 18 can be added to the mixer 10 (e.g., a catalyst such as tertiary amines in dipropylene glycol in a range from 0.005 to 0.05 percent by weight, such as 0.02 percent by weight). The components can be allowed to react. In one embodiment, the reaction can be allowed to continue in the mixer until a viscosity of the composition is in the range of 10,000 to 30,000 centipoise, such as 15,000 to 25,000 centipoise, typically 20,000 centipoise. The composition can then be drained. A conventional drying agent 20 can optionally be added to the mixer 10. One suitable drying agent can include an isocyanate, such as but not limited to p-toluenesulfonyl isocyanate, commercially available from Van Chem, Inc. If the viscosity is not in the range described above, a solvent 22, such as an organic solvent, such as but not limited to acetone, methylisobutylketone, methylethylketone, xylene, or toluene, can be further added to the mixer 10. In one embodiment, the solvent 22 can be added in a range from 1 to 25 percent by weight in order to lower the viscosity of the composition into the desired range. By way of non-limiting examples, if the composition is used to coat black powder, 1% to 6% of acetone can be used. If smokeless powder is used as the explosive material, 2% to 3% of toluene can be used as the solvent. After the addition of the solvent 22, the composition can be mixed further. In one embodiment, the composition can be mixed for a period of 10 minutes to 3 hours, such as greater than 30 minutes, typically 2 hours, and then drained. The step of adding solvent 22 and mixing can be repeated until the desired viscosity of the composition is reached.

Figure 2:
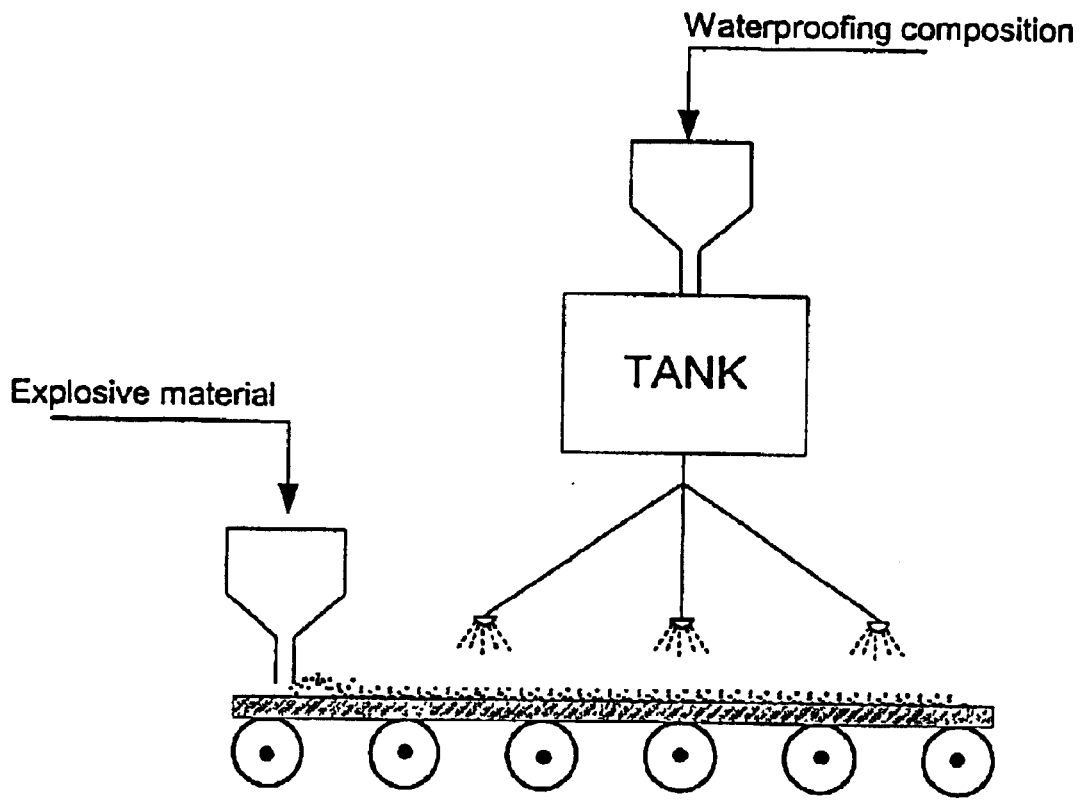
FIG. 2 shows an exemplary method of coating an explosive material with a composition made in accordance with the present invention.

FIG. 2 shows an exemplary method of coating an explosive material. The explosive material is placed on a conventional conveyor. The composition of the invention can be applied, e.g., sprayed, onto the explosive material as the conveyor is traveling along its path. The explosive material can be dried, e.g., air dried under room temperature. The final product is a coated explosive material where the coating functions as a moisture barrier. As will be appreciated, the composition can be applied by any conventional means, such as but not limited to spraying, dipping, rolling, via a mixing auger, or any other suitable manner.

The general concepts of the invention will be further illustrated in the following Examples. However, it is to be understood that the following Examples are merely illustrative of the specific embodiments of the invention and are not to be considered as limiting.

EXAMPLE 1

This example illustrates the preparation of a composition used to waterproof an explosive material. 5 grams of 4,4'-diphenylmethane diisocyanate (LUPRANATE® MI) and 0.003 grams of isocyanatobenzene (MONDUR ML) were added to a container. Then, 10 grams of polybutadiene (POLY BD® R-45 HTLY) was also added to the container and mixed for one hour. The temperature increased due to friction heating, but did not exceed 65° C. 0.003 grams of the DABCO® 33 LV catalyst was then added to the container. The reaction took place in the container for about 100 minutes. The composition in the container was a syrup-like mixture. In order to adjust the handling properties, 0.1 grams of p-toluenesulfonyl isocyanate was added to the container as a drying agent and mixed for about ten minutes. The composition was drained from the container at a final viscosity of approximately 20,000 centipoise.

EXAMPLE 2

1.0 percent by weight of acetone was added to the composition of Example 1 and mixed in the same container in order to achieve an even lower viscosity for easier coating of the explosive material. Mixing occurred for an additional two hours and then the composition was drained. The composition was then used to coat about one pound of black powder by immersing the black powder into the composition. The black powder was then allowed to air dry for about 12 minutes. The coated black powder was then tested by pouring it into water and leaving it for about 30 seconds. The coated black powder was skimmed off the water and drained on a paper towel to air dry. Afterwards, the coated black powder was tested and was still able to attain ignition.

It will be understood by those skilled in the art that while the foregoing description sets forth in detail preferred embodiments of the present invention, modifications, additions, and changes might be made thereto without departing from the spirit and scope of the invention. Therefore, the invention is not limited to the previously disclosed exemplary embodiments.

I claim:

1. A composition for waterproofing explosive material, the composition comprising:
 a) 25 to 40 percent by weight, based on the total weight of the composition, of at least one polyisocyanate;
 b) 45 to 85 percent by weight, based on the total weight of the composition, of a polymer derived from 1,3-butadiene and containing functional groups that are reactive with an isocyanate group;
 c) 0.005 to 0.05 percent by weight, based on the total weight of the composition, of an aromatic isocyanate wherein the aromatic isocyanate comprises isocyanatobenzene; and
 d) 0.005 to 0.05 percent by weight, based on the total weight of the composition, of a catalyst.

2. The composition of claim 1, further comprising a drying agent in a range from 0.05 to 1.5 percent by weight based on the total weight of the composition.

3. The composition of claim 2, wherein the drying agent comprises p-toluenesulfonyl isocyanate.

4. The composition of claim 1, wherein the polyisocyanate comprises mixed isomers of diphenylmethane diisocyanate.

5. The composition of claim 4, wherein the mixed isomers of diphenylmethane diisocyanate in the composition comprise 4,4'-diphenylmethane diisocyanate.

6. The composition of claim 4, wherein the composition further comprises 0 to 25 percent by weight of a solvent selected from a group consisting of acetone, methylisobutylketone, methylethylketone, xylene, and toluene.

7. The composition of claim 1, wherein the polymer comprises terminal hydroxyl groups.

8. The composition of claim 1, wherein the catalyst comprises a mixture of tertiary amines.

9. The composition of claim 1, wherein the composition has a viscosity in a range from 10,000 to 30,000 centipoise.

* * * * *